United States Patent
Takimoto

(10) Patent No.: US 9,600,478 B2
(45) Date of Patent: Mar. 21, 2017

(54) DISPLAY CONTROL APPARATUS, DISPLAY CONTROL METHOD, AND PROGRAM

(71) Applicant: SONY CORPORATION, Tokyo (JP)

(72) Inventor: Yuuji Takimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 224 days.

(21) Appl. No.: 14/152,038

(22) Filed: Jan. 10, 2014

(65) Prior Publication Data

US 2014/0210800 A1  Jul. 31, 2014

(30) Foreign Application Priority Data

Jan. 30, 2013 (JP) ................. 2013-015434

(51) Int. Cl.
*G06F 3/038* (2013.01)
*G09G 5/00* (2006.01)
*G06F 17/30* (2006.01)

(52) U.S. Cl.
CPC .................. *G06F 17/30* (2013.01)

(58) Field of Classification Search
CPC ........ G06F 3/048; G06F 3/0481; G06F 3/041; G06F 17/30; G09G 3/20
See application file for complete search history.

(56) References Cited

U.S. PATENT DOCUMENTS

2008/0253663 A1* 10/2008 Gotoh ............... G06F 17/30241
382/225
2011/0252350 A1* 10/2011 Chaudhri ............ G06F 3/04817
715/769
2014/0201681 A1* 7/2014 Mahaffey .......... H04M 1/72569
715/846

FOREIGN PATENT DOCUMENTS

JP  2008-250605 A  10/2008

* cited by examiner

*Primary Examiner* — Andrew Sasinowski
*Assistant Examiner* — Brent D Castiaux
(74) *Attorney, Agent, or Firm* — Chip Law Group

(57) ABSTRACT

There is provided a display control apparatus including a display environment detection unit configured to detect a display environment of content, a clustering condition setting unit configured to set a clustering condition of the content based on the display environment, a clustering unit configured to execute clustering of the content based on the clustering condition, and a display control unit configured to display the content on a display unit based on a result of the clustering.

18 Claims, 9 Drawing Sheets

FIG.3

|  | LOW | MEDIUM LEVEL | LARGE |
|---|---|---|---|
| PHOTOGRAPH | SHOOTING DATE | SHOOTING DATE + EVENT | SHOOTING DATE + SUB-EVENT |
| BOOK | GENRE | AUTHOR (A-E, F-J,....) | AUTHOR (A, B, C,....) |
| SONG | GENRE | GENRE + ARTIST | GENRE + ARTIST + ALBUM |
| ... | ... | ... | ... |

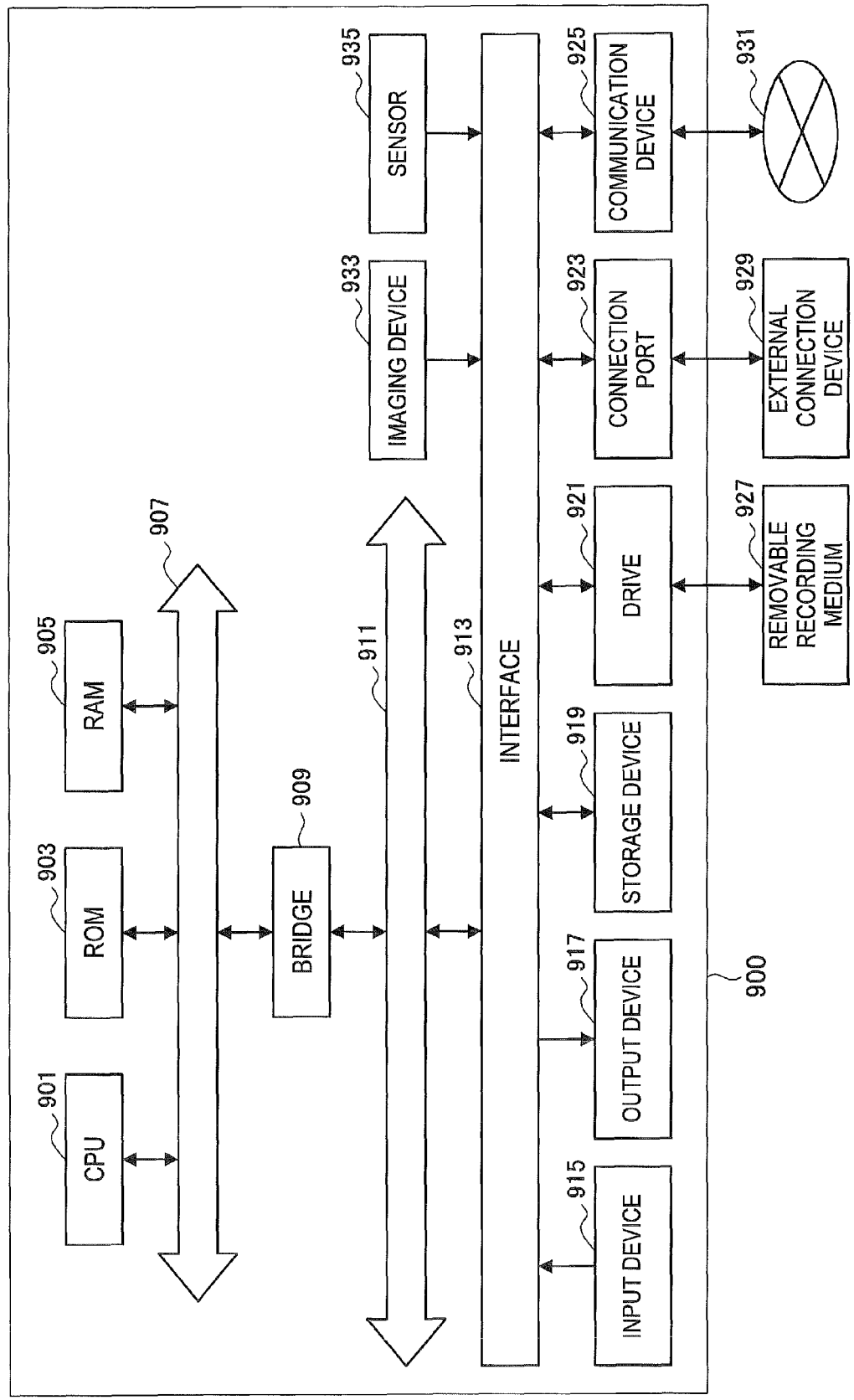

DISPLAY CONTROL APPARATUS, DISPLAY CONTROL METHOD, AND PROGRAM

CROSS REFERENCE TO RELATED APPLICATIONS

This application claims the benefit of Japanese Priority Patent Application JP 2013-015434 filed Jan. 30, 2013, the entire contents of which are incorporated herein by reference.

BACKGROUND

The present disclosure relates to a display control apparatus, a display control method, and a program.

The amount of electronic content held by users, such as photographic image files taken with a digital camera and document files, is on an ever-increasing track. Consequently, technologies have been proposed that, when a user views content, for example, increases the ease of searching by organizing the content, and enables the content that is desired by the user to be accessed more quickly and more easily. For example, JP 2008-250605A describes a technology in which clustering is executed based on position information included in image content, and the image content is divided into groups based on a result of the clustering and a predetermined grouping condition.

SUMMARY

In the technology described in JP 2008-250605A, since a cluster size, content density and the like are set by the user as a grouping condition, the content can be displayed in groups that are based on the user's preferences. However, even when the same user is viewing the content, the grouping condition might not be the same. For example, the appropriate grouping condition may be different based on when, where, and who the user is with, and what apparatus the user is using to view the content.

According to embodiments of the present disclosure, there are provided a novel and improved display control apparatus, display control method, and program, that enable content to be displayed in an appropriate grouping based on a display environment.

According to an embodiment of the present disclosure, there is provided a display control apparatus including a display environment detection unit configured to detect a display environment of content, a clustering condition setting unit configured to set a clustering condition of the content based on the display environment, a clustering unit configured to execute clustering of the content based on the clustering condition, and a display control unit configured to display the content on a display unit based on a result of the clustering.

According to an embodiment of the present disclosure, there is provided a display control method including detecting a display environment of content, setting a clustering condition of the content based on the display environment, executing clustering of the content based on the clustering condition, and displaying the content on a display unit based on a result of the clustering.

According to an embodiment of the present disclosure, there is provided a program for realizing on a computer a function of detecting a display environment of content, a function of setting a clustering condition of the content based on the display environment, a function of executing clustering of the content based on the clustering condition, and a functon of displaying the content on a display unit based on a result of the clustering.

By setting a clustering condition of content based on a display environment, and clustering and displaying the content based on that clustering condition, content can be displayed by appropriately grouping based on the display environment.

According to one or more of embodiments of the present disclosure, content can be displayed in an appropriate grouping based on a display environment.

BRIEF DESCRIPTION OF THE DRAWINGS

FIG. 3 is a diagram illustrating an example of setting a clustering condition so that cluster granularity changes based on a display environment according to a first embodiment of the present disclosure;

FIG. 9 is a block diagram illustrating a hardware configuration of an information processing apparatus.

DETAILED DESCRIPTION OF THE EMBODIMENTS

Figure 1:
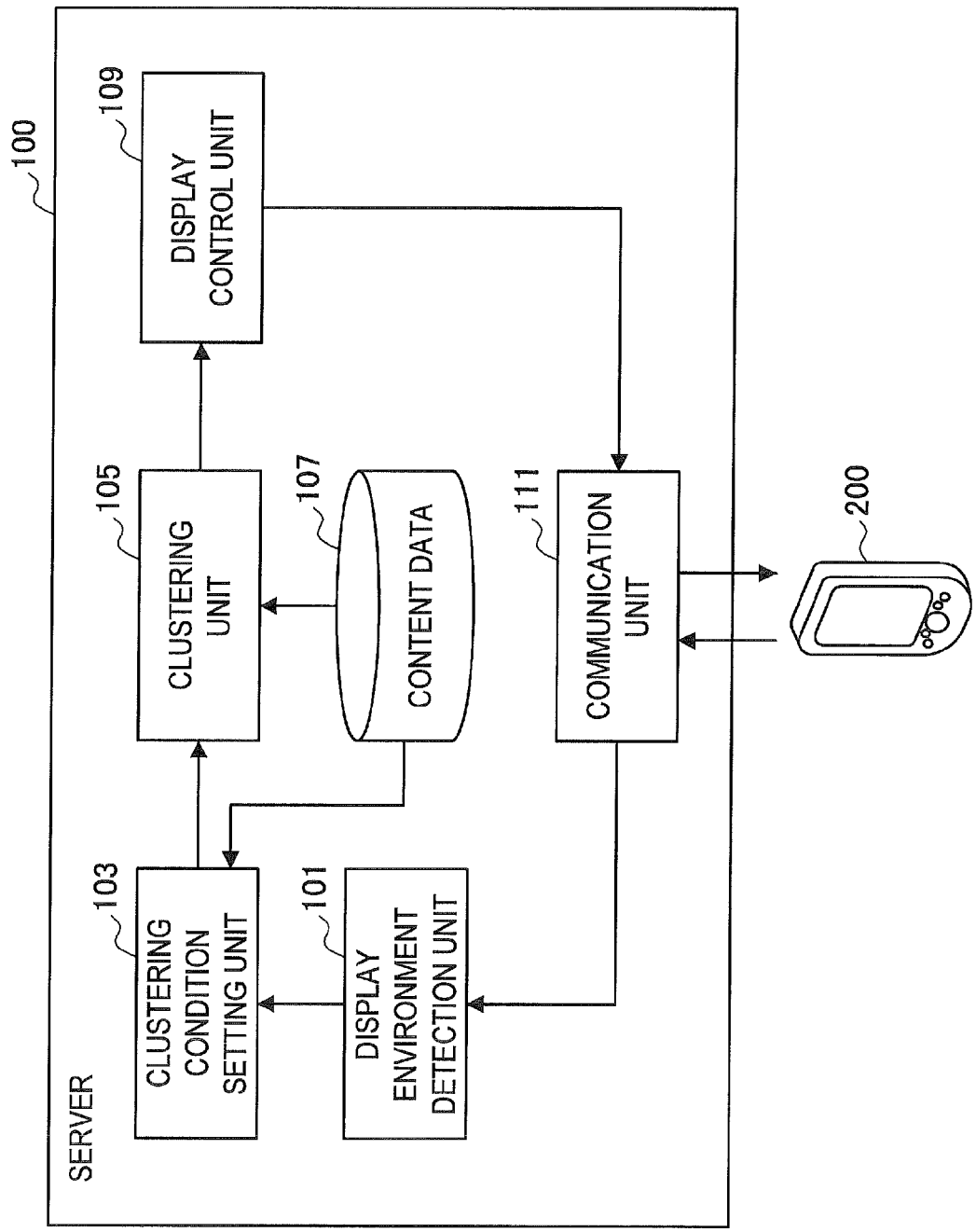
FIG. 1 is a block diagram illustrating a schematic function configuration of a system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be carried out in the following order.
1. First embodiment of the present disclosure
1-1. Function configuration
1-2. Processing flow
1-3. Example of clustering condition setting
1-4. Example of display of content
1-5. Example of dynamic change of a clustering condition
2. Second embodiment of the present disclosure
3. Hardware configuration
4. Supplements
(1. First Embodiment of the Present Disclosure)
First, a first embodiment of the present disclosure will be described with reference to FIGS. 1 to 7.
(1-1 Function Configuration)
FIG. 1 is a block diagram illustrating a schematic function configuration of a system according to the first embodiment of the present disclosure. As illustrated in FIG. 1, a system 10 includes a server 100 and a client 200. The server 100 is realized by one or a plurality of server apparatuses connected to each other by a wired or wireless network. In the present embodiment, the server 100 functions as a display control apparatus. The client 200 is, for example, a terminal device used by a user, such as a mobile telephone (smartphone), a personal computer, a media player, or a game player. The client 200 has at least a display that lets the user view content. The server 100 and the client 200 are interconnected by a wired or wireless network.

In the present embodiment, the server apparatus and the terminal device can be realized by the hardware configuration of the below-described information processing apparatus, for example, It is noted that since the client 200 may have a function configuration that various types of known terminal devices with a content viewing function have, a detailed description of the function configuration will be omitted here.

The server 100 includes, for example, a display environment detection unit 101 that is realized by software using a processor such as a CPU (central processing unit), a clustering condition setting unit 103, a clustering unit 105, a display control unit 109, a communication unit 111 realized by a communication apparatus that executes network communication, and a storage device that stores content data 107.

The display environment detection unit 101 detects a display environment of content on the client 200 based on information acquired via the communication unit 111. The content display environment may be, for example, a specification of the client 200, such as the display size of the client 200 or the processing capability of the client 200. It is noted that if the client 200 displays a window for an application on the display, "display size" can mean the size of the application window for viewing the content, not the size of the whole display of the client 200. The information indicating the specification of the client 200 may be directly provided from the client 200, for example. Alternatively, the information indicating the specification of the client 200 may be acquired by the display environment detection unit 101, which has received from the client 200 information specifying the model, making an inquiry to a server that provides specification information about each model.

Further, the content display environment may be, for example, the situation when the content is displayed, such as a time or location when the user views the content using the client 200, or the people who are with the user then. The situation when the content is displayed can be specified based on, for example, the time at which a content display request was received from the client 200, position information about the client 200 at that time, and information about another terminal device positioned near the client 200 that can be specified based on position information and a result of communication between devices. In addition, as the situation when the content is displayed, the weather when the user views the content may be acquired. In this case, the weather may be acquired by the display environment detection unit 101, which has acquired information about the time and location where the user views the content, making an inquiry to a server that provides meteorological information about the weather at that time at that location.

The clustering condition setting unit 103 sets a content clustering condition based on the display environment detected by the display environment detection unit 101. The clustering unit 105 executes content clustering based on the clustering condition set by the clustering condition setting unit 103. In the present embodiment, the content may be any kind of data, such as an image file, a document file, or an audio file, for example, that is stored in the server 100 as content data 107.

The clustering unit 105 can cluster the content based on, for example, an attribute of the data, such as the name (file name) of the content, the creator, updater, owner, creation date and time, update date and time, data format, size or the like. Further, the clustering unit 105 can also cluster the content based on, for example, information extracted from each piece of content itself, such as the type, number, or expression of an object in an image file, the title of a document file or the like. In addition, the clustering unit 105 can also cluster the content based on, for example, information added to each piece of content as metadata, such as a tag, like the shooting date of a photograph, the shooting position of the photograph, the photographer, an object in the photograph or the like associated with an image file, the type of document, the author, or a book genre associated with a document file, and the composer or players of a song, the genre, the recorded album or the like associated with an audio file.

Content clustering can be executed by converting information like that described above into a feature quantity vector in a feature space, setting a threshold for the distance between pieces of content in the feature space and the number of pieces of content included in a cluster, and classifying similar content in the same cluster. In this case, examples of the clustering condition may include what to set as a feature amount vector element, how each piece of information is converted to generate the feature amount vector, what value the threshold is set at and what kind of threshold is used when classifying the content into clusters and the like. The clustering condition setting unit 103 changes a part or all of such clustering conditions based on the display environment. It is noted that a specific example of the setting of a clustering condition by the clustering condition setting unit 103 will be described below.

The display control unit 109 displays content on the display based on the result clustering by the clustering unit 105. The display of content based on the result of clustering may be, for example, displaying content from each cluster. In this case, the clusters to be displayed may be a part of or all of the clusters formed by the clustering. Further, the content belonging to a cluster may be displayed in its entirety, or a representative portion may be displayed.

It is noted that the expression "display of content" mentioned here includes the display of a character string, such as a file name, or a list of icons, that represent content, for example. Further, if the content is an image file or a document file, an image or a condensed version of the document may be displayed instead of, or together with, the character string or icons. In addition, if the content is an image file with a small size, "display of content" may mean the display of that content as is. As described above, in the present embodiment, the content is displayed by the client 200 and provided for the user's viewing. Therefore, in the present embodiment, the display control unit 109 controls the display of content via network communication by the communication unit 111. A specific example of the display of content by the display control unit 109 will be described below.

The communication unit 111 can be realized by a communication apparatus that executes network communication. The communication unit 111 receives, for example, a content display request and information for detecting the content display environment from the client 200. Further, the communication unit 111 transmits to the client 200 information for displaying content under the control of the display control unit 109. In addition, the communication unit 111 may also communicate with a server other than the client 200. For example, the communication unit 111 may transmit to another server an inquiry from the display environment detection unit 101 based on information received from the client 200, and receive from the server a reply to this inquiry. Consequently, for example, the specification of the client 200, and information about the weather when the content is displayed and about the position of another terminal device can be acquired. Further, the communication unit 111 may also acquire content stored in an external storage server. In this case, the server 100 may be configured without the content data 107, and a part or all of the content data may be acquired from the external storage server.

(1-2. Processing Flow)

Figure 2:
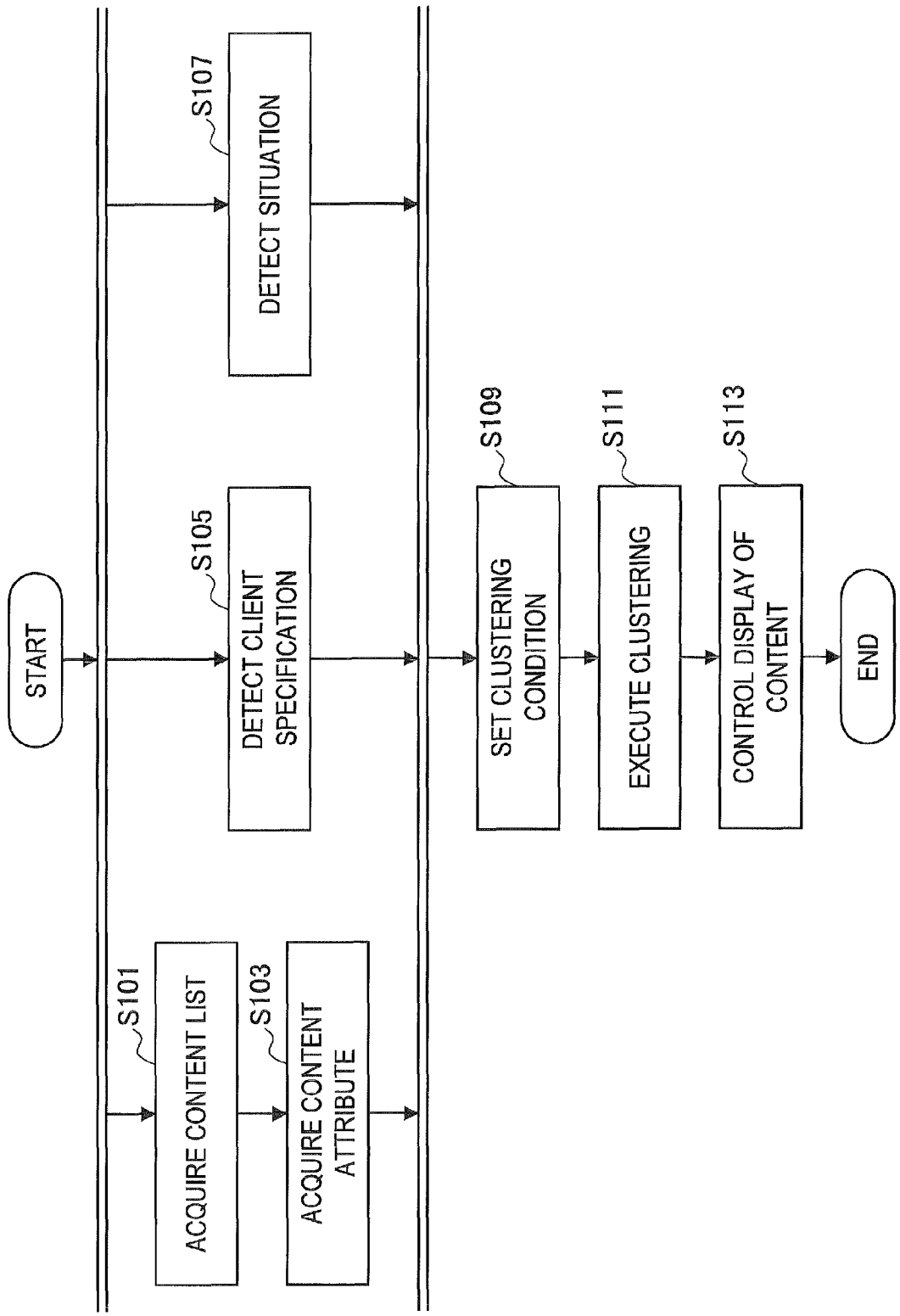
FIG. 2 is a flowchart illustrating an example of processing according to a first embodiment of the present disclosure.

FIG. 2 is a flowchart illustrating an example of processing according to the first embodiment of the present disclosure. This flowchart illustrates an example of processing performed by the server 100 when a content display request from the client 200 has been received.

When the communication unit 111 receives a content display request, the processing performed in the below steps S101, S103, S105, and S107 is executed, and then a clustering condition is set by the clustering condition setting unit 103 (step S109). It is noted that in the following, although the following description will follow this order, the processing of steps S101 to S107 can be independently executed. Therefore, a part or all of the processing may be executed in parallel, or the processing may even be executed in an order different to that described below.

First, the clustering condition setting unit 103 acquires a content list by referring to the content data 107 (step S101). Then, the clustering condition setting unit 103 analyzes the content included in the content list, and acquires a content attribute (step S103). Examples of content attributes include information about the type of content, such as an image file, a document file, or an audio file, a file format and the like.

It is noted that the reason why the clustering condition setting unit 103 acquires a content attribute here is because the clustering condition that should be set depends on the content attributes. For example, information relating to an object or imaging position may be unique to an image file. Further, information relating to a composer or players of a song, a genre and the like may be unique to an audio file. Accordingly, the clustering condition setting unit 103 specifies the type of clustering condition to be set by acquiring an attribute of the content that is to be clustered.

On the other hand, the display environment detection unit 101 detects the specification of the client 200 (step S105). As described above, the specification of the client 200 may be detected, for example, from information provided from the client 200, or by the display environment detection unit 101 making an inquiry to another server based on information provided from the client 200. The display environment detection unit 101 provides information about the detected client specification to the clustering condition setting unit 103.

In addition, the display environment detection unit 101 detects the situation when the content is displayed (step S107). As described above, the situation when the content is displayed may be detected, for example, from information provided from the client 200, or by the display environment detection unit 101 making an inquiry to another server based on information provided from the client 200. The display environment detection unit 101 provides information about the detected situation to the clustering condition setting unit 103.

It is noted that although in the illustrated example the display environment detection unit 101 detects as the display environment both the specification of the client 200 and the situation when the content is displayed, in other examples just one of these may be detected.

The clustering condition setting unit 103 receives the results of the above processing, and sets the clustering condition (step S109). As described above, the clustering condition may be, for example, a condition obtained by converting information relating to the content into a feature quantity vector, a threshold when the content is classified into clusters using the feature quantity vector and the like.

Next, the clustering unit 105 executes content clustering based on the set clustering condition (step S111). Performing clustering enables the content to be classified into a plurality of clusters.

Next, the display control unit 109 controls the display of content based on the result of clustering (step S113). As described above, in the present embodiment, the display control unit 109 controls the display of content of the client 200 via network communication. For example, the display control unit 109 displays content from each cluster. The displayed clusters and content may be displayed in their entirety, or just as a part thereof.

(1-3. Example of Clustering Condition Setting)

Next, a specific example of setting the clustering condition according to the first embodiment of the present disclosure will be described with reference to FIGS. 3 and 4.

FIG. 3 is a diagram illustrating an example of setting a clustering condition so that the cluster granularity changes based on the display environment according to the first embodiment of the present disclosure.

In the present embodiment, the clustering condition setting unit 103 can set the clustering condition so that the number of clusters into which content is classified, namely, the cluster granularity, changes based on the display environment.

More specifically, for example, when using a feature quantity vector, the number of clusters into which content is classified decreases, namely, the granularity of the clusters becomes coarser, by reducing the axis of the feature quantity to be set, increasing the threshold for the distance at the feature space for classifying content into the same cluster, and increasing the threshold for the number of pieces of content included in the clusters. Conversely, the number of clusters into which content is classified increases, namely, the granularity of the clusters becomes finer, by adding the axis of the feature quantity to be set, decreasing the distance threshold, and decreasing the threshold for the number of pieces of content included in the clusters.

In this case, for example, if the display size of the client 200 used by the user to view the content is small, or if the processing performance is poor, or if the communication state is unstable, the clustering condition setting unit 103 can set the clustering condition so that the cluster granularity is coarser. For example, when the display size is small, if there is a large number of clusters, the user repeatedly scrolls many times in order to grasp all of the displayed content, which is troublesome. Further, when the processing performance is low or the communication state unstable, if there is a large number of clusters, it takes a long time to download and display the images showing the content classified into the respective clusters. In such cases, by making the cluster granularity coarser so that the number of clusters is reduced, for example, the user can quickly grasp all of the content classified into the respective clusters, which enables the user to find the cluster into which a desired piece of content was classified more quickly. Conversely, if the display size is large, the processing performance is high, and the communication state is stable, the clustering condition can be set by the client 200 so that the cluster granularity is finer. This means that the content is displayed based on a more detailed classification, which allows the user to find the cluster into which a desired piece of content was classified more quickly.

A specific example of setting such a clustering condition is illustrated in FIG. 3. The horizontal axis of the table represents the content type, and the vertical axis represents the clustering condition that is set for each piece of content that can be displayed by the client 200 (an example of a display environment that is based on the size of the display).

In the illustrated example, when the content type is a "photograph" (an image file), if the displayable number is low, clustering that includes the shooting date as a condition is executed. In this case, since pieces of content having the same or a close shooting date are classified into the same cluster regardless of the content subject matter, the cluster granularity becomes coarser. On the other hand, if the displayable number is a medium level, clustering that includes an event as a condition in addition to the shooting date is executed. In this case, since pieces of content that were shot at different events are classified into different clusters even if they have the same shooting date, the cluster granularity becomes finer. In addition, if the displayable number is large, clustering that includes a sub-event which is further specified within the shooting date as a condition is executed. In this case, since pieces of content are classified into clusters based on sub-event units that are even more detailed than the event, the cluster granularity becomes even finer.

On the other hand, when the content type is a "book" (a document file), if the displayable number is low, clustering that includes the genre of the book as a condition is executed. Further, if the displayable number is a medium level, clustering that includes an alphabet grouping of the first letter of the author's name (A to E, F to J, . . . ) as a condition is executed. In addition, if the displayable number is large, clustering that includes the first letter of the author's name (A, B, C, . . . ) as a condition is executed. Thus, even for books, the clustering condition can be set so that the cluster granularity changes based on the display environment.

Moreover, when the content type is a "song" (an audio file), if the displayable number is low, clustering that includes the genre of the song as a condition is executed. On the other hand, if the displayable number is a medium level, clustering that includes the artist as a condition in addition to the genre is executed. Still further, if the displayable number is large, clustering that includes the recorded album as a condition in addition to the genre and the artist is executed. Thus, even for songs, the clustering condition can be set so that the cluster granularity changes based on the display environment.

Figure 4:
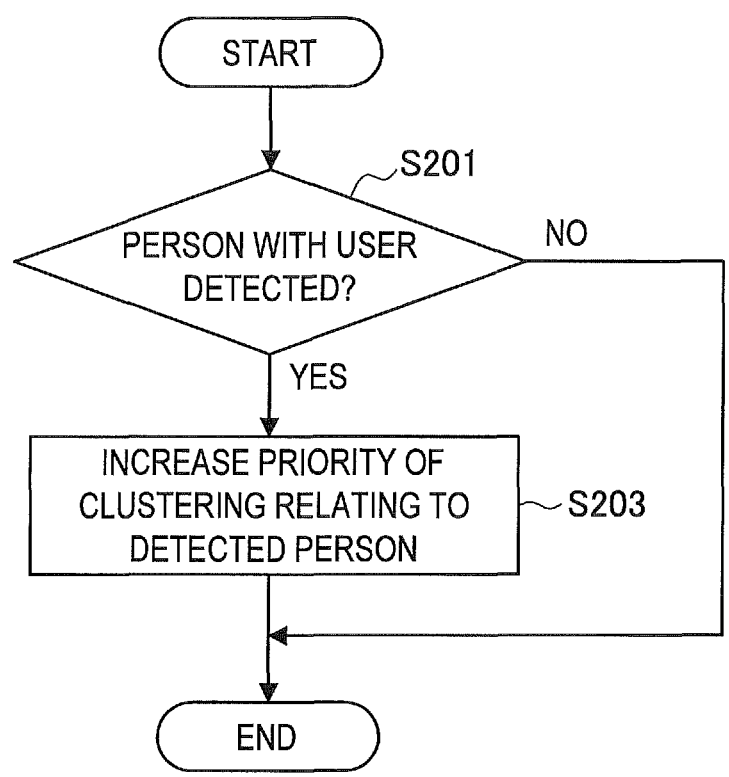
FIG. 4 is a flowchart illustrating an example of setting a clustering condition so that content satisfying a predetermined condition is preferentially clustered according to a first embodiment of the present disclosure.

FIG. 4 is a flowchart illustrating an example of setting a clustering condition so that content satisfying a predetermined condition is preferentially clustered according to the first embodiment of the present disclosure.

In the present embodiment, the clustering condition setting unit 103 can also set the clustering condition and execute clustering so that content that is expected to be in high demand for viewing by the user is easily viewed based on information about the time and location when the user views the content or information about the weather or the people the user is with, that is detected as the display environment. Here, content that is expected to be in high demand for viewing by the user may be, for example, content having a common attribute with the attribute detected as the display environment (e.g., the time, location, weather, people the user is with etc.).

More specifically, for example, when using a feature quantity vector, by making information corresponding to a set condition be more easily reflected in a feature quantity vector element, content that satisfies that condition can be more easily classified into a different cluster to content that does not satisfy the condition. Further, content that satisfies that condition can be easily clustered in a more detailed manner based on another condition, while content that does not satisfy the condition can be easily classified into the same cluster even if another condition is slightly different.

A specific example of processing for setting such a clustering condition is illustrated in FIG. 4. The flowchart illustrates a part of the processing performed by the clustering condition setting unit 103. Here, the clustering condition setting unit 103 determines whether a person is with the user who is trying to view the content by referring to a detection result from the display environment detection unit 101 (step S201). If it is determined that a person with the user has been detected, the clustering condition setting unit 103 sets the clustering condition so that a clustering priority degree relating to the detected person is increased (step S203). More specifically, for example, in the case of an image file, a feature quantity vector element can be set that is greatly different depending on whether the detected person is set as a tag about an object or a person with the user.

Based on this processing, content relating to the people with the user when the user views the content is preferentially clustered. For example, when a priority degree has not been set for clustering, if photograph content is clustered as follows, {Event 1, event 2, event 3, date 1, date 2, event 4, and event 5} whether a friend X appears as an object in events 1 to 5 is recorded as information about the people who were with the user. On the other hand, whether a partner Y appears as an object in dates 1 or 2 is recorded as information about the people who were with the user.

For example, if friend X is with the user when the user views the above-described content, content relating to friend X is preferentially clustered based on processing performed by the clustering condition setting unit 103 like that illustrated in FIG. 4. Therefore, the content may be clustered, for example, as follows.

{Event 1, event 2, event 3, dates (1+2), event 4, and event 5}

In this case, the cluster of date 1 and date 2, which are not related to friend X, is grouped together. However, the cluster of events 1 to 5, which are related to friend X, becomes a separate cluster. This enables a photograph of an event where the user and friend X were both at to be viewed more easily.

On the other hand, if partner Y is with the user when the user views the above-described content, content relating to partner Y is preferentially clustered based on processing performed by the clustering condition setting unit 103 like that illustrated in FIG. 4. Therefore, the content may be clustered, for example, as follows.

{Events (1+2+3), date 1, date 2, events (4+5)}

In this case, the cluster of events 1 to 3 and events 4 and 5, which are not related to partner Y, is grouped together. However, the cluster of date 1 and date 2, which are related to partner Y, becomes a separate cluster. This enables a photograph of a date that the user and partner Y spent together to be viewed more easily.

It is noted that although FIG. 4 illustrates an example of processing that is performed based on a person who is with the user when the user is viewing the content as a condition, the same processing can also be performed based on the time or location of the user when the user views the content, the weather and the like.

(1-4. Example of Display of Content)

Next, a specific example of the display of content according to the first embodiment of the present disclosure will be described with reference to FIGS. 5 ad 6.

Displaying content based on the result of clustering is effective in increasing content detectability, and in enabling the user to access desired content faster and more easily. However, depending on the display method, such advantageous effects may not be sufficiently obtained.

For example, content classified into six clusters A to F may be displayed, in which cluster A has seven pieces of content (A1 to A7), cluster B has five pieces of content (B1 to B5), cluster C has six pieces of content (C1 to C6), cluster D has four pieces of content (D1 to D4), and cluster E has five pieces of content (E1 to E5).

This content is displayed on a display capable of displaying 16 pieces of content on one page. In this case, the content classified in clusters A and B and a portion of the content classified in cluster C (C1 to C4) is displayed on the first page. Further, the remaining portion of the content classified in cluster C (C5 and C6) and the content classified in clusters D and E is displayed on the second page.

Here, the content is displayed on the respective pages in order regardless of the cluster the content was classified in. In this case, on the first page, first, the content classified in cluster A (A1 to A7) is sequentially displayed, then the content classified in cluster B (B1 to B5) is sequentially displayed, and then the content classified in cluster C (C1 C4) is sequentially displayed.

Even based on this display method, if the communication speed between the server 100 and the client 200 is sufficient, and the processing speed in the server 100 and the client 200 is sufficient, the content of the three clusters included in the first page can be displayed in a comparatively short time. However, in practise, it often takes a certain amount of time until the content is displayed due to the communication speed not being sufficient because the client 200 is a mobile terminal or the like, or the processing speed in the server 100 or the client 200 not being sufficient. Consequently, if the content is displayed based on the above-described order, it can take a long time until the content of the last cluster on the page (C1 to C4) is displayed.

In some cases the content desired by the user may not be in the content displayed on the first page. Therefore, it is desirable to determine whether the desired content is present as quickly as possible, and proceed to the second page if it is not there. However, as described above, if the communication speed or the processing speed is insufficient, it takes a long time to reach the state where it can be determined whether the desired content is on the first page, which can diminish the advantages, such as detectability, that are gained by clustering content.

Accordingly, the display control unit 109 in the server 100 according to the first embodiment of the present disclosure can, for example, control the display of content that has been clustered as illustrated in the following two examples. This enables the advantages that are gained by clustering content to be utilized more effectively.

FIRST EXAMPLE

Figure 5:
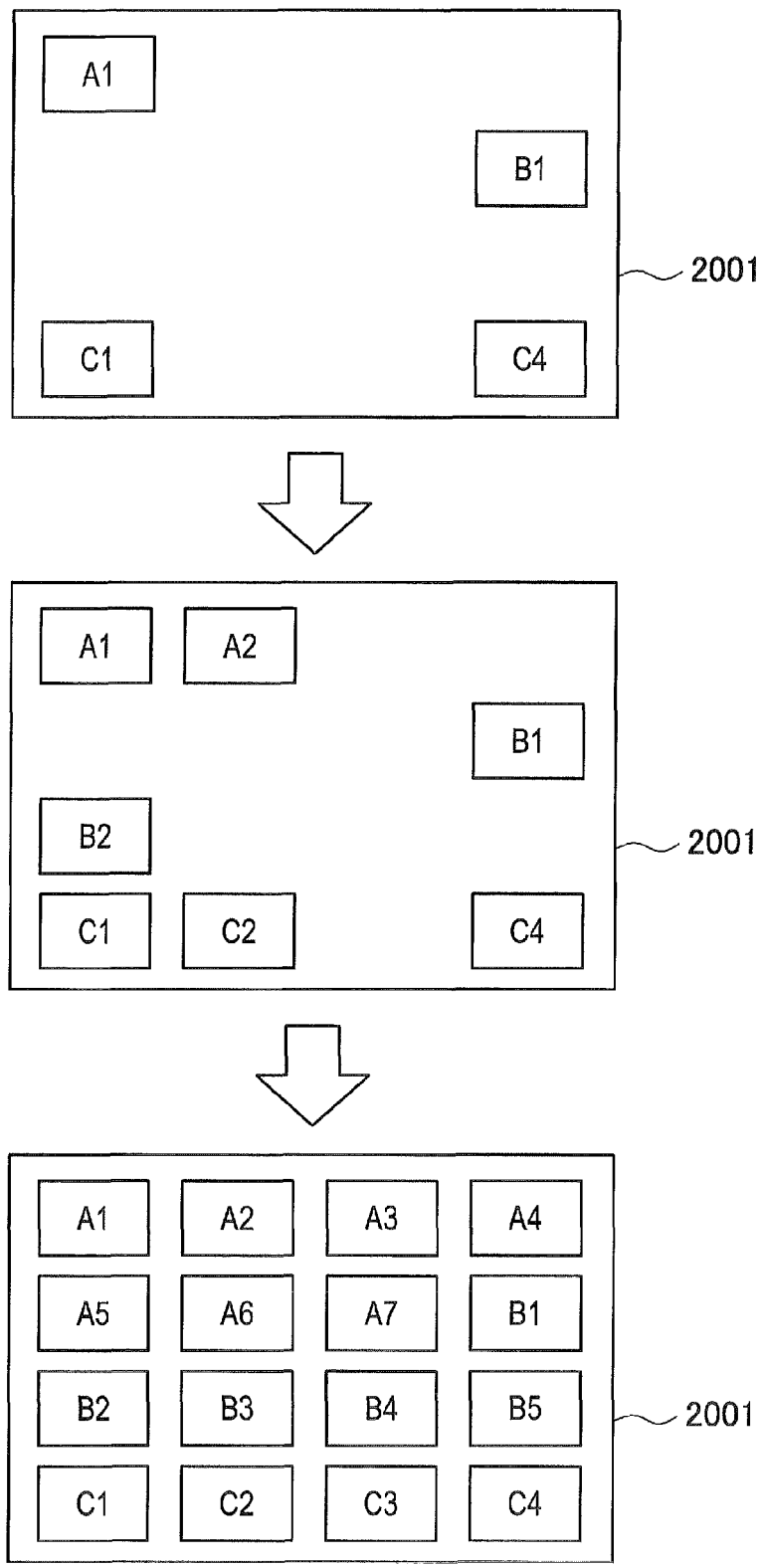
FIG. 5 is a diagram illustrating a first example of display of content according to a first embodiment of the present disclosure.

FIG. 5 is a diagram illustrating a first example of display of content according to the first embodiment of the present disclosure. First, the display control unit 109 displays the content (A1, B1, and C1) positioned at the head of each of clusters A to C on page 2001. These pieces of content are representative content of the clusters displayed on page 2001. This representative content may be, for example, content positioned at the head of results obtained by arranging the content based on file name or update data and time, or extracted based on a feature quantity as content that best represents a characteristic of the cluster.

Here, the display position of the content that is displayed first (A1, B1, and C1) is the same as the display position when all of the content classified in clusters is displayed. Namely, at this stage, there are gaps between the displayed content (A1, B1, and C1) where the content to be displayed later (A2 to A7 and B2 to B5) will be. Further, the display control unit 109 can also display the content (C4) that is displayed last on page 2001 at the same timing as the content positioned at the head of each cluster.

Next, the display control unit 109 displays the content to be positioned second from each of the clusters A to C (A2, B2, and C2), and then similarly sequentially displays the third and subsequent pieces of content from each cluster. Thus, since there are gaps between the content that is already displayed where the content to be displayed later will be, even when the content of the second and subsequent pages is displayed, the display position of the already displayed content does not change. Namely, this first example can be said to be an example in which the content of the second and subsequent pages is sequentially displayed while maintaining visibility by not changing the position of the already displayed content.

The user can learn at an early stage what kind of content is displayed due to the representative content of each cluster displayed on page 2001 being displayed first. Therefore, the user can determine at an early stage whether the desired content is displayed on page 2001. If the user learns that the desired content is not displayed on page 2001, the user can proceed to the next page and display the content of clusters D and E without waiting to download the remaining content of clusters A to C.

Further, at this point, by displaying the content (C4) to be displayed last on page 2001 at an early stage, the user can easily recognize the range of the content displayed on page 2001. For example, when displaying content in order of date and time using information such as the file creation date and time, the shooting date and the like, it is useful to know at an early stage what content will be displayed last on the page.

It is noted that the above-described first example can be applied not only in cases when the page on which the content is displayed has a fixed length and the content is displayed by switching in units of pages, but even when the page on which the content is displayed has a length that is based on the number of pieces of content and content is displayed by sequentially scrolling. In this case, if the page is scrolled before all of the content included in the display range of the page has been displayed, the above-described step-like display of content is temporarily stopped, and the order of the display of content is reset based on the display range after scrolling. At this point, if the display range before and after scrolling overlaps, the already displayed content may continue to be displayed, and the order of the display for the rest of the content may be reset.

SECOND EXAMPLE

Figure 6:
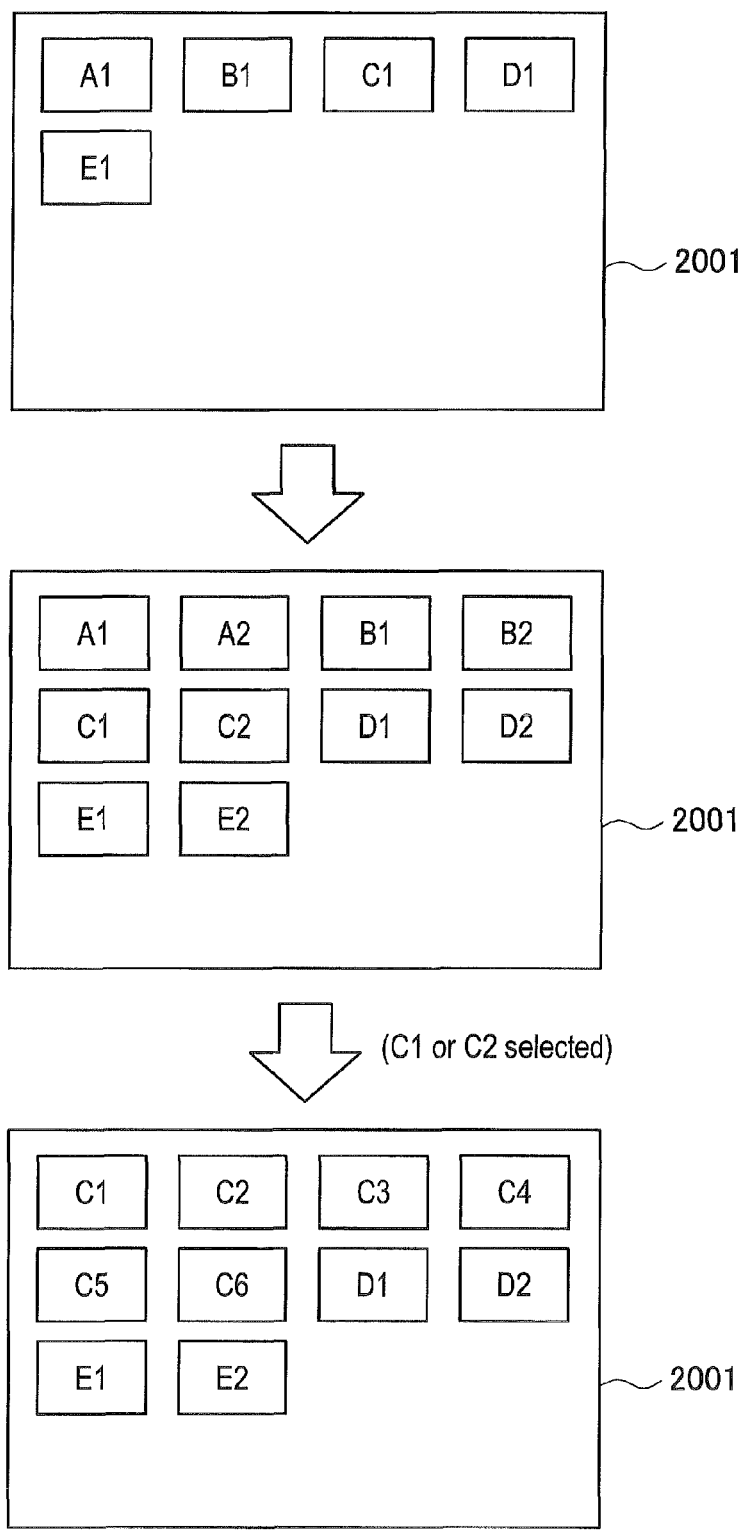
FIG. 6 is a diagram illustrating a second example of display of content according to a first embodiment of the present disclosure.

FIG. 6 is a diagram illustrating a second example of display of content according to the first embodiment of the present disclosure. First, the display control unit 109 displays the content (A1, B1, C1, D1, and E1) positioned at the head of each of clusters A to E formed by clustering on page 2001. Unlike the first example, the head content is displayed in order from the top of the display position.

Next, the display control unit 109 displays the content to be positioned second from each of the clusters A to E (A2, B2, C2, D2, and E2). In this case, among the already displayed content (A1, B1, C1, D1, and E1), the display position of the content other than the head A1 is shifted back by the insertion of the content to be displayed into the gap. Next, the third and subsequent pieces of content of each cluster are similarly sequentially displayed. However, each time a piece of content is displayed, the display position of the already displayed content is shifted back by the amount of the content that is added.

In the illustrated example, since the total number of pieces of content that can be displayed on page 2001 is 16, when the fourth piece of content of each cluster has been displayed, no more content can be put on page 2001. In such a case, the clusters positioned at the rear, namely, the display of the content of clusters D and E, are shifted, so that in the end, similar to the above-described first example, the content classified in clusters A and B and part of the content classified in cluster C (C1 to C4) may be displayed on page 2001. Alternatively, when content can no longer be placed on page 2001, the addition of the display of content can be temporarily stopped.

In whichever case, for example, when the user selects content from any of the clusters, the content of that cluster can be preferentially displayed. In the illustrated example, the user selects either of the pieces of content (C1 or C2) classified in cluster C at the point when the second piece of content of each cluster has been displayed. In this case, the display control unit 109 may move the cluster C to the head of page 2001, and preferentially display the rest of the content of cluster C (C3 to C6). At this point, the addition of the display of the content of clusters D and E that is displayed later can be temporarily stopped.

By first displaying representative content of each cluster based on clustering, the user can know at an early stage what kind of content is included for not only the clusters on page 2001, but also for the clusters displayed on other pages. Therefore, the user can know at early stage which cluster the desired content is classified in, and can, for example, preferentially display like the above-described cluster C. However, in this second example, since the display position of the already displayed content moves each time a display of other content is added, visibility may not be as high as in the first example.

It is noted that the above-described second example can be applied not only in cases when the page on which the content is displayed has a fixed length and the content is displayed by switching in units of pages, but also when the page on which the content is displayed has a length that is based on the number of pieces of content and content is displayed by sequentially scrolling. In this case, if the page is scrolled before all of the content included in the display range of the page has been displayed, the above-described step-like display of content is temporarily stopped, and the order of the display of content is reset based on the display range after scrolling.

In the above case, in the second example, since the display position of the content is continuous from the top, the scrolling can be executed within the range of content that is displayed at that point. Namely, at least one piece of the content displayed before scrolling is included in the display range after scrolling. Consequently, the order of the display of content can be reset based on the remaining content. For example, in the example illustrated in FIG. 6, if the page is scrolled in the midst of the display of content so that content (C1, C2, D1, D2, E1, and E2) remains in the display range, the display of the content of clusters A and B that are beyond the display range is stopped, and the display order of the content of clusters C to E that remains in the display range is reset. As a result, the content that is displayed next may be content (C3, D3, or E3)

It is noted that in the above two examples, although cases were described in which images of icons, thumbnails and the like representing content were displayed as tiles, the display format of the content is not limited to this. For example, the content may be displayed as a list of icons and character strings. In this case too, the display order of the list can be controlled in the same manner as in the above-described two examples.

Next, an example of dynamic change of the clustering condition according to the first embodiment of the present disclosure will be described with reference to FIG. 7.

Figure 7:
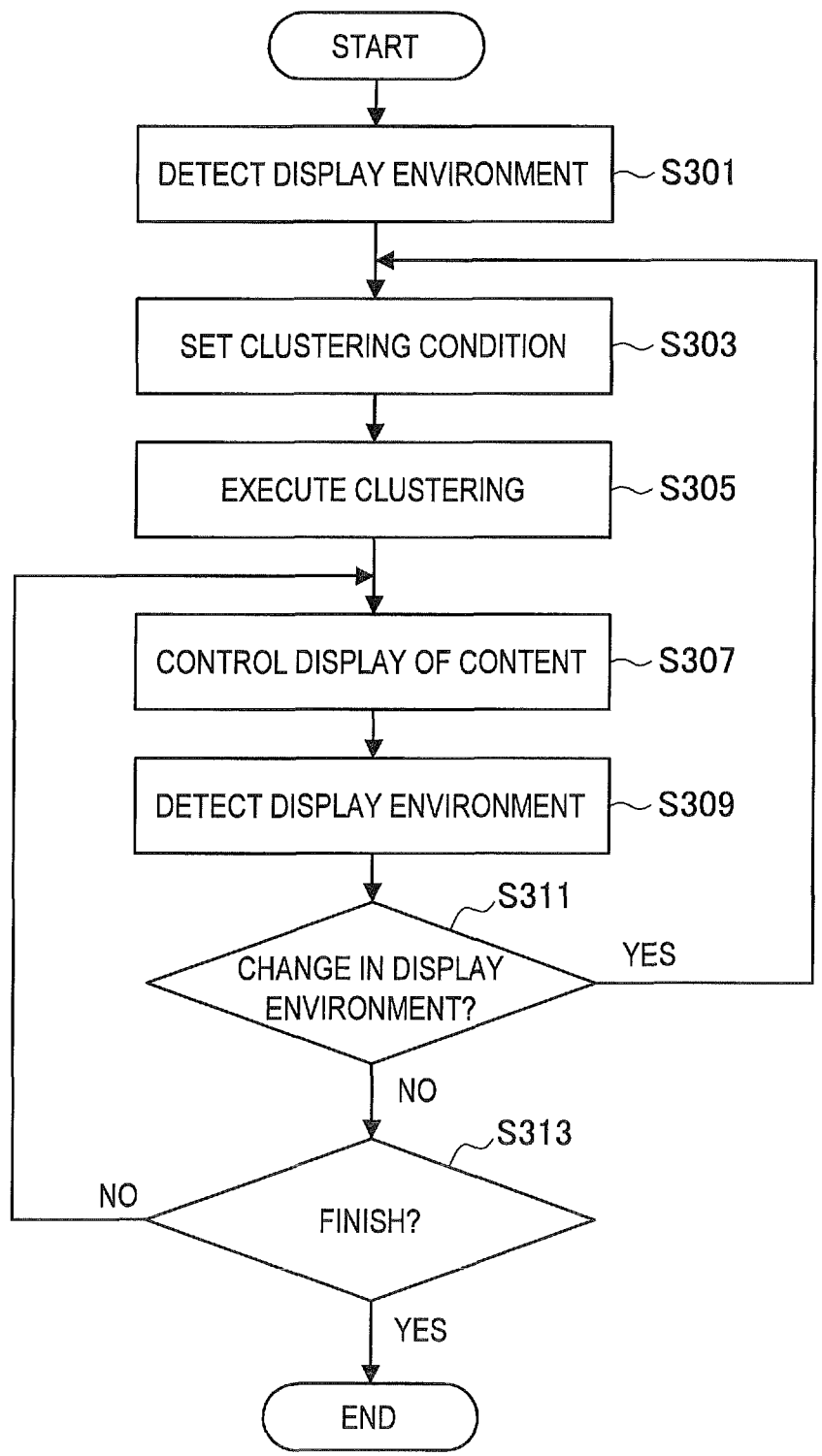
FIG. 7 is a flowchart illustrating an example of dynamically changing a clustering condition according to a first embodiment of the present disclosure.

FIG. 7 is a flowchart illustrating an example of dynamically changing the clustering condition according to the first embodiment of the present disclosure.

As described up to this point, in the present embodiment, the display environment when the user views content is detected by the server 100 using the client 200, and clustering is executed based on a clustering condition that is set based on the display environment. Here, the display environment can change not only at the start time of content viewing, but also at any instant during viewing of the content. For example, the size of an application window for viewing content with the client 200 can be changed. Further, position information when the user moves while holding the client 200 can change, and the position information and communication state can also greatly change when the user gets on a train. In addition, over time, people who are with the user can move away, people who were not with the user can come near, and the weather may change.

Accordingly, in the following, the display environment detection unit 101 in the server 100 detects the display environment even during viewing of content on the client 200. When there is a change in the display environment, the clustering condition setting unit 103 resets the clustering condition based on the display environment detected by the display environment detection unit 101, and the clustering unit 105 again executes clustering based on the reset condition.

More specifically, first, during viewing of content, the display environment detection unit 101 detects the display environment (step S301), the clustering condition setting unit 103 sets the clustering condition based on the detected display environment (step S303), and the clustering unit 105 executes clustering based on the set clustering condition (step S305). Further, the display control unit 109 controls the display of the content on the client 200 display based on the result of clustering (step S307).

While this content is being viewed, the display environment detection unit 101 again detects the display environment (step S309), and the clustering condition setting unit 103 determines whether the detected display environment has changed from when viewing of the content started (or, from the previous detection time) (step S311). Examples of changes in the display environment that may be detected in step S311 include the size of the application window, position information about the user or the communication state, changes in the people with the user, changes in the weather or the like.

If it is determined in step S311 that the display environment has changed, the clustering condition setting unit 103 resets the clustering condition (step S303), and the clustering unit 105 again executes clustering based on the reset clustering condition. Then, the display control unit 109 controls the display of content based on the result of the re-executed clustering (step S307).

On the other hand, if it is not determined in step S311 that the display environment has changed, the display control unit 109 repeats the control of the display of content (step S307) until a predetermined finishing condition is satisfied (step S313). Further, the display environment detection unit 101 also repeats the detection of the display environment during the duration that the display of content is continuing (step S309).

Thus, detecting changes in the display environment that happen during viewing of the content with the display environment detection unit 101 enables an appropriate display of content that is based on the changed display environment. It is noted that the detection by the display environment detection unit 101 of the display environment during viewing of the content can be executed periodically at a predetermined interval, or executed when the display control unit 109 changes the display of content based on a user operation and the like. Alternatively, the detection of the display environment during viewing of the content can also be executed based on a request transmitted by the client 200 when the display environment has changed.

In the above-described first embodiment of the present disclosure, for example, when, where, and who the user is with, and what apparatus the user is using to view the content are detected as the content display environment. Setting the clustering condition based on this display environment enables a display of appropriately grouped content by the user to be provided.

For example, if content on a server is displayed by a client like in the present embodiment, the type of terminal device, which is a client, can change. Therefore, for example, it is effective to detect the type of terminal device as the display environment, and adjust the clustering granularity to match the size of the display. Further, in this case, it is also effective to display the content of each cluster in parallel in order to prevent a difference in the timing at which content is displayed for each cluster from occurring due to the time taken for communication between the server and the client and the time taken for the display processing by the client.

2. Second Embodiment of the Present Disclosure

Next, a second embodiment of the present disclosure will be described with reference to FIG. 8.

Figure 8:
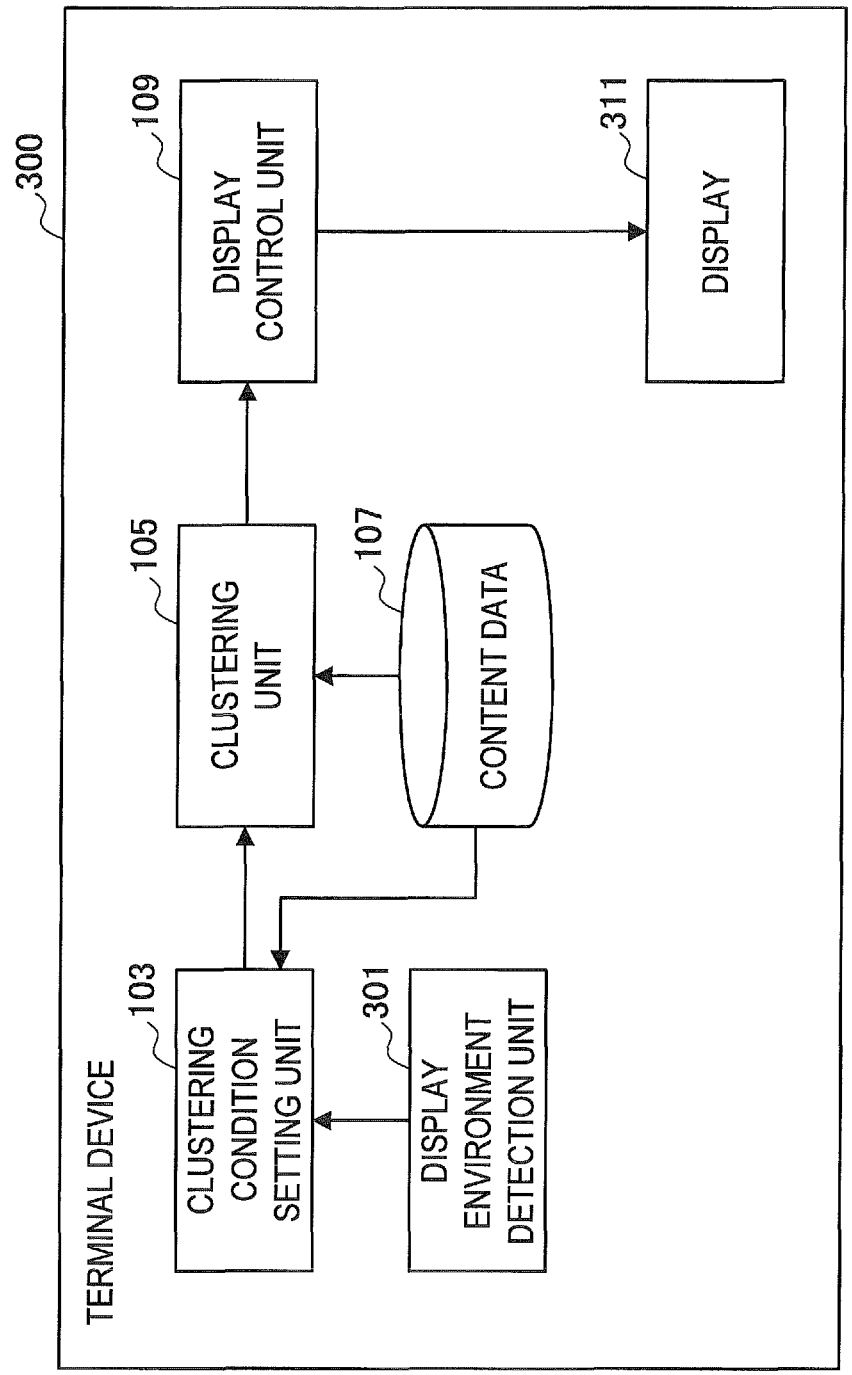
FIG. 8 is a block diagram illustrating a schematic function configuration of a terminal device according to a second embodiment of the present disclosure.

FIG. 8 is a block diagram illustrating a schematic function configuration of a terminal device according to the second embodiment of the present disclosure. As illustrated in FIG. 8, a terminal device 300 includes, for example, a display environment detection unit 301 that is realized by software using a processor such as a CPU, a clustering condition setting unit 103, a clustering unit 105, a display control unit 109, a storage device that stores content data 107, and a display 311.

The terminal device 300 is a device such as a mobile telephone (a smartphone), a personal computer, a media player a game machine or the like. The user views content using the display 311. In the present embodiment, since the viewed content is stored in the terminal device 300 itself, the terminal device 300 realizes the functions of the server 100 and the client 200 according to the above-described first embodiment of the present disclosure.

The display environment detection unit 301 detects the content display environment of the terminal device 300. The detected content display environment may be the same as that detected in the first embodiment of the present disclosure. However, in the present embodiment, the display environment detection unit 301 internally acquires the same information as that acquired via network communication from the client 200 in the first embodiment of the present disclosure. Further, similar to the first embodiment of the present disclosure, the display environment detection unit 301 can detect the display environment by making an inquiry to an external server via a not-illustrated communication device based on information acquired from inside the terminal device 300.

Since the clustering condition setting unit 103, the clustering unit 105, the content data 107, and the display control unit 109 are the same as in the above-described first embodiment of the present disclosure, a detailed description thereof will be omitted here. It is noted that the display control unit 109 controls the display of content on the display 311 internally, not via network communication.

In the present embodiment, the content stored in the terminal device itself is displayed. In this case too, for example, since the size of the window, and when, where, and who the user views content with can change, it is effective to detect these display environments, and preferentially cluster and display the appropriate content, for example. Further, even when displaying content without transmitting via network communication, since it can take time to perform the internal reading, rendering and the like, for example, it can be effective to control the display of content in a manner like that described with reference to FIGS. 5 and 6 in the first embodiment of the present disclosure.

It is noted that in the above-described example, although the content is stored in the terminal device, the embodiments of the present disclosure are not limited to this. For example, a part or all of the content may be stored in an external storage server. In this case, the terminal device can acquire content data from the server, set a clustering condition, perform clustering, and execute display control based on the result of clustering.

3. Hardware Configuration

A hardware configuration of the information processing apparatus according to the embodiment of the present disclosure will be described with reference to FIG. 9. FIG. 9 is a block diagram for explaining a hardware configuration of the information processing device. The illustrated information processing device 900 may be implemented as a server device including a terminal device and the server in the embodiments described above, for example.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuit such as a DSP (Digital Signal Processor), alternatively or in addition to the CPU 901.

The CPU 901 serves as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 primarily stores program which are used in the execution of the CPU 901 and parameters which is appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 may be a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may include a display device such as LCD (Liquid Crystal Display), PDP (Plasma Display Panel), and organic EL (Electro-Luminescence) displays, an audio output device such as speaker and headphone, and a peripheral device such as printer. The output device 917 may output the results obtained from the process of the information processing apparatus 900 in a form of a video such as text or image, and an audio such as voice or sound.

The storage device 919 is a device for data storage which is configured as an example of a storage unit of the information processing apparatus 900. The storage device 919 includes, for example, a magnetic storage device such as HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 can write in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

4. Supplement

The embodiments of the present disclosure may also include, for example, a display control apparatus (a server or a terminal device) such as described above, a system, a display control method executed by a display control apparatus or system, a program that functions as a display control apparatus, and a non-transitory medium having a program recorded therein.

Although in the above-described examples, a display environment detected by a display environment detection unit was reflected in the content clustering condition in real time, the embodiments of the present disclosure are not limited to such an example. For example, a display environment detected when displaying content may be stored in a storage unit of the server or the terminal device, and the display environment detection unit may read the same content later when re-displaying content. This enables content to be watched again by performing clustering that reflects the same environment as when that content was watched in the past (the time, position, people with the user etc.), for example.

Additionally, the present technology may also be configured as below.

(1) A display control apparatus including:
 a display environment detection unit configured to detect a display environment of content;
 a clustering condition setting unit configured to set a clustering condition of the content based on the display environment;
 a clustering unit configured to execute clustering of the content based on the clustering condition; and
 a display control unit configured to display the content on a display unit based on a result of the clustering.

(2) The display control apparatus according to (1), wherein the clustering condition setting unit is configured to set the clustering condition so that granularity of clusters formed by the clustering changes based on the display environment.

(3) The display control apparatus according to (2), wherein the clustering condition setting unit is configured to set the clustering condition so that the cluster granularity changes based on the number of content that can be displayed on the display unit.

(4) The display control apparatus according to (3),
 wherein the display environment detection unit is configured to detect at least a size of the display unit, and
 wherein the clustering condition setting unit is configured to set the clustering condition so that the cluster granularity changes based on the size of the display unit.

(5) The display control apparatus according to any one of (1) to (4), wherein the clustering condition setting unit is configured to set the clustering condition so that content satisfying a condition set based on the display environment is preferentially clustered.

(6) The display control apparatus according to (5), wherein the clustering condition setting unit is configured to set the clustering condition so that content having a common attribute with an attribute detected as the display environment is preferentially clustered.

(7) The display control apparatus according to any one of (1) to (6),
 wherein the display control unit is configured to detect the display environment during display of the content,
 wherein the clustering condition setting unit is configured to reset the clustering condition when the detected display environment has changed, and
 wherein the clustering unit is configured to again execute the clustering when the clustering condition has been reset.

(8) The display control apparatus according to any one of (1) to (7), wherein the display control unit is configured to display the content from each cluster formed by the clustering.

(9) The display control apparatus according to (8), wherein the display control unit is configured to display a piece of representative content of each cluster before other content.

(10) The display control apparatus according to (9), wherein the display control unit is configured to display the content on each page, and display the piece of representative content of the clusters displayed on each page.

(11) The display control apparatus according to (10), wherein the display control unit is configured to display the representative content at a same display position as when the other content is displayed.

(12) The display control apparatus according to (10) or (11), wherein the display control unit is configured to display the content displayed last on each page before the other content.

(13) The display control apparatus according to (9), wherein the display control unit is configured to, after displaying the representative content, insert the other content between the pieces of representative content and display the other content.

(14) The display control apparatus according to any one of (8) to (13), wherein the display control unit is configured to display the content on each page, and when any of the pieces of displayed content of the clusters is selected, move the selected piece of content of the culsters to a head of the page.

(15) The display control apparatus according to any one of (8) to (14), wherein the display control unit is configured to, when any of the pieces of displayed content of the clusters is selected, display content that has not yet been displayed in the selected content of the cluster, before content that has not yet been displayed in the other clusters.

(16) The display control apparatus according to any one of (1) to (15), further including
 a communication unit configured to communicate with a terminal device having the display unit, receive from the terminal device information for detecting the display environment, and transmit to the terminal device information for displaying the content.

(17) The display control apparatus according to any one of (1) to (15), further including
 the display unit.

(18) A display control method including:
 detecting a display environment of content;
 setting a clustering condition of the content based on the display environment;
 executing clustering of the content based on the clustering condition; and
 displaying the content on a display unit based on a result of the clustering.

(19) A program for realizing on a computer:
 a function of detecting a display environment of content;
 a function of setting a clustering condition of the content based on the display environment;
 a function of executing clustering of the content based on the clustering condition; and
 a functon of displaying the content on a display unit based on a result of the clustering.

It should be understood by those skilled in the art that various modifications, combinations, sub-combinations and alterations may occur depending on design requirements and other factors insofar as they are within the scope of the appended claims or the equivalents thereof.

What is claimed is:

1. A first display control apparatus, comprising:
a display environment detection unit configured to detect a display environment of a plurality of contents on a second display control apparatus;
a clustering condition setting unit configured to set a clustering condition of the plurality of contents based on the display environment;
a clustering unit configured to cluster the plurality of contents based on the clustering condition; and
a display control unit configured to display the plurality of contents on a display unit of the second display control apparatus based on a result of the clustering.

2. The display control apparatus according to claim 1, wherein the clustering condition setting unit is configured to set the clustering condition so that granularity of clusters changes based on the display environment.

3. The display control apparatus according to claim 2, wherein the clustering condition setting unit is configured to set the clustering condition so that the cluster granularity changes based on the number of contents that can be displayed on the display unit.

4. The display control apparatus according to claim 3,
wherein the display environment detection unit is configured to detect at least a size of the display unit of the second display control apparatus, and
wherein the clustering condition setting unit is configured to set the clustering condition so that the cluster granularity changes based on the size of the display unit.

5. The display control apparatus according to claim 1, wherein the clustering condition setting unit is configured to set the clustering condition so that contents among the plurality of contents, which satisfy a condition set based on the display environment are clustered.

6. The display control apparatus according to claim 5, wherein the clustering condition setting unit is configured to set the clustering condition so that contents among the plurality of contents which include a common attribute with an attribute detected as the display environment are clustered.

7. The display control apparatus according to claim 1,
wherein the display control unit is configured to detect the display environment during display of the plurality of contents on the second display control apparatus,
wherein the clustering condition setting unit is configured to reset the clustering condition in response to change in the detected display environment, and
wherein the clustering unit is configured to again clustering in response to a determination that the clustering condition has been reset.

8. The display control apparatus according to claim 1, wherein the display control unit is configured to display contents of each cluster among the plurality of clusters.

9. The display control apparatus according to claim 8, wherein the display control unit is configured to display representative contents of each cluster before other contents of the corresponding cluster.

10. The display control apparatus according to claim 9, wherein the display control unit is configured to:
display the plurality of contents on one or more pages, and
display the representative contents of each of the clusters on the one or more pages.

11. The display control apparatus according to claim 10, wherein the display control unit is configured to display the representative contents of each cluster at a same display position in response to a display of the other contents of the corresponding cluster.

12. The display control apparatus according to claim 10, wherein the display control unit is configured to display contents among the plurality of contents at last of the one or more pages before display of the other contents among the plurality of contents.

13. The display control apparatus according to claim 9, wherein the display control unit is configured to:
insert the other contents of the corresponding cluster between the representative contents of each cluster, and
display the other contents of the corresponding cluster.

14. The display control apparatus according to claim 8, wherein the display control unit is configured to:
display the contents from each cluster on one or more pages, and
in response to selection of displayed content of a cluster among the plurality of clusters, move the selected content of the cluster to a head of the one or more pages.

15. The display control apparatus according to claim 8, wherein the display control unit is configured to:
in response to selection of displayed content of a cluster among the plurality of clusters, display other contents, that corresponds to the cluster, before display contents, that corresponds to other clusters among the plurality of clusters.

16. The display control apparatus according to claim 1, further comprising:
a communication unit configured to communicate with the second display control apparatus which has the display unit, receive from the second display control apparatus information for detection of the display environment, and transmit to the second display control apparatus information to display the content.

17. A display control method comprising:
in a first display control apparatus:
detecting a display environment of a plurality of contents on a second display control apparatus;
setting a clustering condition of the plurality of contents based on the display environment;
clustering the plurality of contents based on the clustering condition; and
displaying the plurality of contents on a display unit of the second display control apparatus based on a result of the clustering.

18. A non-transitory computer-readable recording medium having a set of computer-executable instructions recorded thereon that when executed cause a first display control apparatus to execute operations, comprising:
detecting a display environment of a plurality of contents on a second display control apparatus;
setting a clustering condition of the plurality of contents based on the display environment;
clustering the plurality of contents based on the clustering condition; and
displaying the plurality of contents on a display unit of the second display control apparatus based on a result of the clustering.

* * * * *